United States Patent Office 3,167,562
Patented Jan. 26, 1965

3,167,562
NEW 3-AZABICYCLO[3.3.1]NONANE COMPOUNDS AND A PROCESS FOR PREPARING THESE COMPOUNDS
Issei Iwai and Bunji Shimizu, Tokyo, Japan, assignors to Sankyo Company, Limited, Tokyo, Japan
No Drawing. Filed Mar. 12, 1962, Ser. No. 179,223
Claims priority, application Japan, Mar. 14, 1961,
36/8,257, 36/8,258, 36/8,259
8 Claims. (Cl. 260—294.3)

This invention relates to new 3-azabicyclo[3.3.1]nonane compounds and acid addition salts thereof and a process for preparing these compounds.

More particularly, this invention relates to new 3-azabicyclo[3.3.1]nonane compounds having the general formula

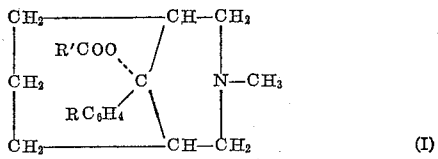

wherein R is a member selected from the group consisting of hydrogen, alkyl of 1 to 2 carbon atoms and alkoxy of 1 to 2 carbon atoms and R′ is alkyl of 1 to 2 carbon atoms and acid addition salts thereof and a process for preparing these compounds. Moreover, this invention relates to new intermediates used for the preparation of compounds having the above-described Formula I and processes for preparing the same.

Heretofore, it is known that 3-methyl-3-azabicyclo[3.3.1]nonane-9-one-1.5-dicarboxylic acid is prepared by Mannich reaction but no utility of the compound is known at all.

As a result of investigations for finding valuable compounds prepared from 3-methyl-3-azabicyclo[3.3.1]nonane-9-one-1.5-dicarboxylic acid we have found that new 3-azabicyclo[3.3.1]nonane compounds having the above-mentioned Formula I and acid addition salts thereof prepared from the aforementioned dicarboxylic acid are valuable as analgesics.

It is an object of this invention to provide 3-azabicyclo[3.3.1]nonane compounds having the above-mentioned Formula I and acid addition salts thereof valuable as analgesics and a process for preparing these compounds.

It is another object of this invention to provide compounds useful as intermediates for the preparation of 3-azabicyclo[3.3.1]nonane compounds having the above-mentioned Formula I and acid addition salt thereof and processes for preparing the same.

According to the present invention, 3-azabicyclo[3.3.1]nonane compounds having the above-described Formula I are obtained by decarboxylating 3-methyl-3-azabicyclo[3.3.1]nonane-9-one-1.5-dicarboxylic acid (II) to form 3-methyl-3-azabicyclo[3.3.1]nonane-9-one (III), reacting the latter compound with a Grignard's reagent represented by the formula

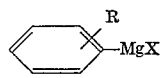

wherein R has the same meaning as above and X is halogen atom to form a mixture of 3-methyl-9α-phenyl (or substituted phenyl)-9β-hydroxy-3-azabicyclo[3.3.1] nonane (IV′) and 3-methyl-9β-phenyl-(or substituted phenyl)-9α-hydroxy - 3 - azabicyclo[3.3.1]nonane (IV), separating compound (IV′) and compound (IV) from the reaction mixture and then reacting compound (IV) thus separated or obtained by treating compound (IV′) obtained as above with an aqueous mineral acid with anhydride or halogenide of lower aliphatic carboxylic acid containing 2 to 5 carbon atoms to form the 3-azabicyclo[3.3.1]nonane compound. These reactions are schematically shown below.

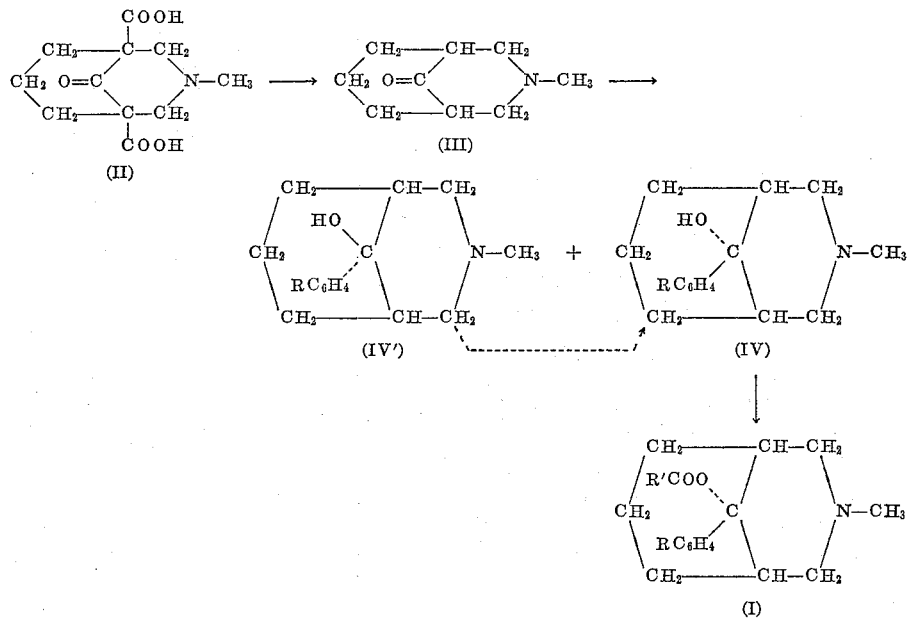

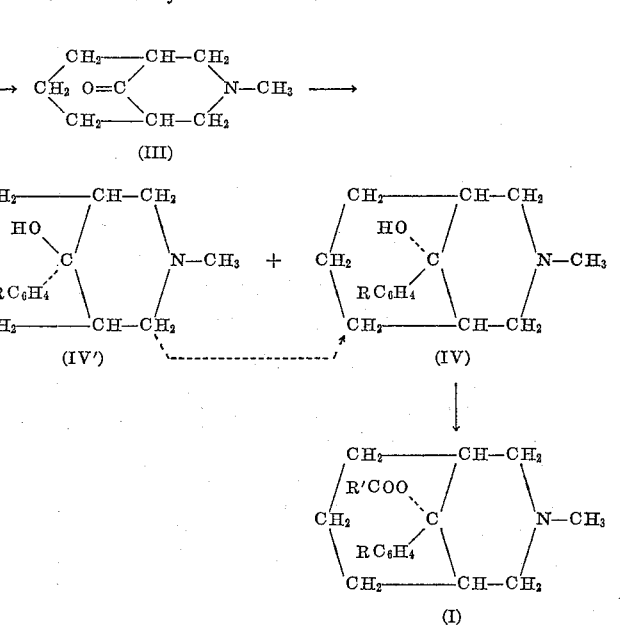

In the above-mentioned reaction scheme R and R′ have the same meaning as above.

The decarboxylation step in this invention, which is conversion of 3-methyl-3-azabicyclo[3.3.1]nonane-9-one-1.5-dicarboxylic acid (II) to 3-methyl-3-azabicyclo[3.3.1]nonane-9-one (III), may be easily carried out, for example, by heating compound (II) in about 50% sulfuric acid at about 140–150° C. for about 6 hours. The desired product, compound (III), may be isolated after completion of the reaction by making the reaction mixture alkaline with an alkali such as sodium hydroxide or potassium hydroxide followed by extraction with an organic solvent such as ether-benzene or chloroform and removing the organic solvent from the extract.

Compound (III) thus obtained is then reacted with a Grignard's reagent represented by the above-described formula. For example, this step may be advantageously effected by adding compound (III) to a solution containing a Grignard's reagent formed by adding bromobenzene or a substituted bromobenzene to a mixture of ether and metallic magnesium and heating the resulting mixture.

3-methyl-9α-phenyl (or substituted phenyl)-9β-hydroxy-3-azabicyclo[3.3.1]nonane (IV') and 3-methyl-9β-phenyl (or substituted phenyl)-9α-hydroxy-3-azabicyclo[3.3.1]nonane (IV) involved in the reaction mixture of compound (III) and the Grignard's reagent may be isolated from the reaction mixture by conventional means. For example, saturated solution of ammonium chloride is added to the reaction mixture of compound (III) and the Grignard's reagent and the aqueous layer thus formed is separated from the ether layer. The ether layer is shaken with an acid such as hydrochloric acid to remove impurities such as diphenyl which remain dissolved in the ether layer. The acid layer is made alkaline by treating with an alkali such as sodium hydroxide, potassium hydroxide or ammonium hydroxide, followed by extraction with an organic solvent such as ether-benzene or chloroform. The organic solvent extract which contains compound (IV') and compound (IV) is chromatographed to isolate the two respectively. Alternatively, from the organic solvent extract is removed the solvent and the residue is recrystallized from petroleum ether to give componud (IV') and compound (IV) separatively.

The next step of this invention, which involves rearrangement of 3-methyl-9α-phenyl (or substituted phenyl)-9β-hydroxy-3-azabicyclo[3.3.1]nonane (IV') to 3-methyl-9β-phenyl (or substituted phenyl)-9α-hydroxy-3-azabicyclo[3.3.1]nonane, may be achieved by treating the former with an aqueous mineral acid such as aqueous hydrochloric acid.

For effecting this step of the invention 3-methyl-9α-phenyl (or substituted phenyl)-9β-hydroxy-3-azabicyclo-[3.3.1]nonane (IV') is heated, preferably in 5–20% hydrochloric acid, for example, in 10% hydrochloric acid. After completion of the reaction, the desired product may be isolated by making the reaction mixture alkaline, extracting the alkaline solution with an organic solvent such as ether-benzene or chloroform and removing the organic solvent from the extract.

3-methyl-9β-phenyl (or substituted phenyl)-9α-hydroxy-3-azabicyclo[3.3.1]nonane (IV) is then reacted with an acylating agent such as anhydride or halogenide of lower aliphatic carboxylic acid containing 2 to 5 carbon atoms to produce the final product of this invention (I). In carrying out this step the acylation may be effected under similar conditions to those in the ordinary acylation reactions. After the reaction, the reaction mixture is subjected to distillation under reduced pressure, the residue is dissolved in an alkaline solution, the resulting solution is extracted with an organic solvent such as ether-benzene or chloroform and then the organic solvent is removed from the extract to isolate the desired product.

3-azabicyclo[3.3.1]nonane compounds having the above-described Formula I thus obtained may be converted to their acid addition salts by the conventional methods. For example, when the former compounds are reacted in ether with hydrochloric acid the corresponding hydrochlorides are produced.

The following examples illustrate the invention. It is understood that these examples are furnished only by way of illustration and not limitation.

EXAMPLE 1

*Preparation of 3-methyl-9β-phenyl-9α-hydroxy-3-azabicyclo[3.3.1]nonane*

(1) A mixture of 0.3 g. of 3-methyl-3-azabicyclo-[3.3.1]nonane-9-one-1.5-dicarboxylic acid and 2 g. of 50% sulfuric acid is heated under reflux on an oil bath for 6 hours. After cooled the reaction solution is washed with ether. The acid solution is made alkaline with 20% aqueous sodium hydroxide solution under cooling by ice, followed by extraction with several portions of ether. The combined ether extract is washed with saturated saline water and dried over anhydrous sodium sulfate. The solvent is then removed from the dried extract and the residue is dried under reduced pressure, 2 mm. Hg, for 1.5 hours. The resulting mass is allowed to stand in an ice box to precipitate 3-methyl-3-azabicyclo[3.3.1]-nonane-9-one. Needles, M.P. 12–14° C. The compound has characteristic odor.

*Analysis.*—Calcd. for $C_9H_{15}ON$: C, 70.55%; H, 9.87%. Found: C, 70.21%; H, 10.05%.

(2) To a mixture of 0.56 g. of well scoured magnesium ribbon and 10 ml. of dry ether are added 10 ml. of an ether solution containing 4.4 g. of bromobenzene, followed by addition of a small amount of iodine. Heating for a short period of time results in dissolution of the magnesium with bubbling, which requires about 1.5 hours. To the resulting solution after boiled is added with stirring under reflux a solution of 3.0 g. of 3-methyl-3-azabicyclo[3.3.1]nonane-9-one in 10 ml. of dry ether and 30 ml. of tetrahydrofuran dropwise in a period of about 1.5 hours. The resulting mixture is heated under reflux for additional 2.5 hours. After cooled, 40 ml. of saturated solution of ammonium chloride is added to the reaction mixture. The ether layer then separated is removed and ether extraction of the mother liquor is repeated. The combined ether extract is washed with water and dried. The solvent is then removed by evaporation under reduced pressure and the residue is extracted with 10% hydrochloric acid. The hydrochloric acid extract is made alkaline with sodium hydroxide and the alkaline solution is extracted with ether. From the extract is removed the ether to give a semi-solid material weighing 3.9 g., which is chromatographed on neutral alumina 20 times in weight using benzene as the solvent. Crystalline 3-methyl-9α-phenyl-9β-hydroxy-3-azabicyclo-[3.3.1]nonane is obtained from the first fraction. Yield 2.5 g.

*Analysis.*—Calcd. for $C_{15}H_{21}ON$: C, 77.88%; H, 9.15%. Found: C, 77.65%; H, 9.11%.

Subsequent elution with chloroform-benzene (1:1) gives amorphous substance. Further elution with chloroform gives pale yellow needles of 3-methyl-9β-phenyl-9α-hydroxy[3.3.1]nonane melting at 86–88° C. Yield 0.4 g.

*Analysis.*—Calcd. for $C_{15}H_{21}ON$: C, 77.88%; H, 9.15%. Found: C, 77.94%; H, 9.27%.

EXAMPLE 2

*Preparation of 3-methyl-9β-phenyl-9α-acetoxy-3-azabicyclo[3.3.1]nonane*

To 300 mg. of 3-methyl-9β-phenyl-9α-hydroxy-3-azabicyclo[3.3.1]nonane are added 5 ml. of acetic anhydride and 3 ml. of dry pyridine to give a white turbid solution. By heating the solution on a boiling water bath, it turns to a yellow solution. Heating is continued for additional about 3 hours. After completion of the reaction, excess of the acetic anhydride and pyridine are distilled off under reduced pressure. The residue is mixed with absolute alcohol and the mixture is subjected to distillation under reduced pressure. The residue is mixed with ice water and made alkaline with aqueous ammonia, followed by extraction with chloroform. The extract is washed with water and dried, followed by removal of the solvent by distillation. The residue is dissolved in ether-petroleum ether and the solution is decolorized with active charcoal, followed by concentration under reduced pressure to precipitate crystals of 3-methyl-9β-phenyl-3α-acetoxy-3-azabicyclo[3.3.1]nonane. Needles, melting at 99–101° C. Yield 280 mg.

*Analysis.*—Calcd. for $C_{17}H_{23}O_2N$: C, 74.69%; H, 8.48%; N, 5.12%. Found: C, 74.41%; H, 8.53%; N, 5.05%.

EXAMPLE 3

*Preparation of 3-methyl-9β-phenyl-9α-propionyloxy-3-azabicyclo[3.3.1]nonane*

The same procedures as in Example 2 are repeated except that propionic anhydride is used in place of acetic anhydride. There is produced 3-methyl-9β-phenyl-9α-propionyloxy-3-azabicyclo[3.3.1]nonane, which is a yellow oil and is not crystallized after repeated recrystallizations.

Infrared absorption spectra: 3.56μ (N—CH$_3$), 5.8μ (—OC$_2$H$_5$), 6.2μ, 6.68μ, 7.3μ (phenyl), indication of a ketone bonding (slight).

EXAMPLE 4

*Preparation of 3-methyl-9β-phenyl-9α-hydroxy-3-azabicyclo[3.3.1]nonane*

A mixture of 0.5 g. of 3-methyl-9α-phenyl-9β-hydroxy-3-azabicyclo[3.3.1]nonane and 10 ml. of 10% HCl is heated under reflux for 5 hours. After cooled, the reaction mixture is made alkaline with aqueous ammonia, followed by extraction with ether. The extract is washed with water and dried. The solvent is removed by distillation from the extract and the residue is dissolved in petroleum-ether. The solution is decolorized and then concentrated to a small amount to precipitate crystals of 3 - methyl - 9β - phenyl - 9α-hydroxy-3-azabicyclo[3.3.1] nonane, M.P. 88–90° C. The hydrochloride melts at 240° C. with decomposition. The yield of the free base is 0.45 g. The product is identified to be 3-methyl-9β-phenyl-9α-hydroxy-3-azabicyclo[3.3.1]nonane on the basis of infrared absorption spectra and mixed melting point.

EXAMPLE 5

*Preparation of 3-methyl-9β-p-methylphenyl-9α-acetoxy-3-azabicyclo[3.3.1]nonane*

(1) To a mixture of 0.28 g. of well scoured magnesium ribbon and 10 ml. of dry ether are added 10 ml. of an ether solution containing 2.4 g. of p-bromotoluene, followed by addition of a small amount of iodine. Heating for a short period of time results in dissolution of the magnesium with bubbling, which requires about 1.5 hours. To the resulting solution after boiled is added with stirring under reflux a solution of 0.9 g. 3-methyl 3-azabicyclo [3.3.1]nonane-9-one obtained in (1) of Example 1 in 10 ml. of dry ether and 10 ml. of tetrahydrofuran dropwise in a period of about 1 hour. The resulting mixture is heated under reflux for additional 2.5 hours. After cooled, 20 ml. of saturated solution of ammonium chloride is added to the reaction mixture. The ether layer then separated is removed and ether extraction of the mother liquor is repeated. The combined ether extract is washed with water and dried. The solvent is then removed by evaporation under reduced pressure and the residue is extracted with 10% hydrochloric acid. The hydrochloric acid extract is made alkaline with sodium hydroxide and the alkaline solution is extracted with ether. From the extract is removed the ether to give a liquid material weighing 1.4 g.

(2) A mixture of 1.4 g. of the liquid material (a mixture of 3-methyl-9α-p-methylphenyl-9β-hydroxy-3-phenyl-9α-hydroxy-3-azabicyclo[3.3.1]nonane) obtained in (1) of this example and 10 ml. 10% HCl is heated under reflux for 5 hours. After cooled, the reaction mixture is made alkaline with aqueous ammonia, followed by extraction with ether. The extract is washed with water and dried. The solvent is removed by distillation from the extract and the residue is dissolved in petroleum-ether. The solution is decolorized and then evaporated to dryness to give 3-methyl-9β-p-methylphenyl-9α-hydroxy-3-azabicyclo[3.3.1]nonane as oily substance weighing 1.3 g. The picrate of the product melts at 172–178° C. with decomposition. The hydrochloride of the product melts at 232–235° C. with decomposition.

*Analysis.*—Calcd. for C$_{16}$H$_{23}$ON·HCl·½H$_2$O: C, 66.01%; H, 8.58%. Found: C, 66.21%; H, 8.69%.

(3) To 200 mg. of 3-methyl-9β-p-methylphenyl-9α-hydroxy-3-azabicyclo[3.3.1]nonane are added 5 ml. of acetic anhydride and 3 ml. of dry pyridine. The mixture is heated on boiling water bath to obtain a yellow solution. Heating is continued for additional 2–3 hours. After completion of the reaction excess of the acetic anhydride and pyridine are distilled off under reduced pressure. The reside is mixed with absolute alcohol and the mixture is subjected to distillation under reduced pressure. The residue is mixed with ice water and made alkaline with aqueous ammonia, followed by extraction with chloroform. The extract is washed with water and dried, followed by removal of the solvent by distillation. The residue is dissolved in ether-petroleum ether and the solution is decolorized with active charcoal, followed by concentration under reduced pressure to give as 3-methyl-9β-p-methylphenyl-9α-acetoxy-3-azabicyclo[3.3.1]nonane as oily substance weighing 200 mg. The hydrochloride of the product melts at 200–205° C. with decomposition.

*Analysis.*—Calcd. for C$_{18}$H$_{25}$O$_2$N·HCl·½H$_2$O: C, 64.85%; H, 8.11%. Found: C, 65.01%; H, 8.20%.

EXAMPLE 6

*Preparation of 3-methyl-9β-p-methoxyphenyl-9α-propionyloxy-3-azabicyclo[3.3.1]nonane*

(1) To a mixture of 0.28 g. of well scoured magnesium ribbon and 10 ml. of dry ether are added 10 ml. of an ether solution containing 26 g. of p-bromoanisole, followed by addition of a small amount of iodine. Heating for a short period of time results in dissolution of the magnesium with bubbling, which requires about 1.5 hours. To the resulting solution after boiled is added with stirring under reflux a solution of 0.9 g. of 3-methyl-3-azabicyclo [3.3.1]nonane-9-one obtained in (1) of Example 1 in 10 ml. of dry ether and 10 ml. of tetrahydrofuran dropwise in a period of about 1 hour. The resulting mixture is heated under reflux for additional 2.5 hours. After cooled, 20 ml. of saturated solution of ammonium chloride is added to the reaction mixture. The ether layer then separated is removed and ether extraction of the mother liquor is repeated. The combined ether extract is washed with water and dried. The solvent is then removed by evaporation under reduced pressure, and the residue is extracted with 10% hydrochloric acid. The hydrochloric acid extract is made alkaline with sodium hydroxide and the alkaline solution is extracted with ether. From the extract is removed the ether to give a semi-solid material weighing 1.5 g.

(2) A mixture of 1.5 g. of the semi-solid material (a mixture of 3-methyl-9α-p-methoxyphenyl-9β-hydroxy-3 - azabicyclo[3.3.1]nonane and 3-methyl-9β-p-methoxyphenyl - 9α-hydroxy-3-azabicyclo[3.3.1]nonane) obtained in (1) of this example and 10 ml. of 10% HCl is heated under reflux for 5 hours. After cooled, the reaction mixture is made alkaline with aqueous ammonia, followed by extraction with ether. The extract is washed with water and dried. The solvent is removed by distillation from the extract and the residue is dissolved in petroleum-ether. The solution is decolorized and then evaporated to dryness to give 3-methyl-9β-p-methoxyphenyl-9α-hydroxy-3-azabicyclo[3.3.1]nonane as crystalline material weighing 1.4 g. The product melts at 132–135° C. The hydrochloride of the product melts at 205–210° C. with decomposition.

*Analysis.* — Calcd. for C$_{16}$H$_{23}$O$_2$N·HCl·½H$_2$O: C, 62.63%; H, 8.16%. Found: C, 63.25%; H, 7.92%.

(3) To 200 mg. of 3-methyl-9β-p-methoxyphenyl-9α-hydroxy-3-azabicyclo[3.3.1]nonane are added 5 ml. of propionic anhydride and 3 ml. of dry pyridine. The mixture is heated on boiling water bath to obtain a yellow solution. Heating is continued for additional 2–3 hours. After completion of the reaction excess of the propionic anhydride and pyridine are distilled off under reduced pressure. To residue is mixed with absolute alcohol and the mixture is subjected to distillation under reduced pressure. The residue is mixed with ice water and made alkaline with aqueous ammonia, followed by extraction with chloroform. The extract is washed with water and dried, followed by removal of the solvent by distillation. The residue is dissolved in ether-petroleum ether and the solution is decolorized with active charcoal, followed by concentration under reduced pressure to give as 3-methyl-9β-p-methoxyphenyl-9α-propionyloxy-3-azabicyclo [3.3.1] nonane as oily substance weighing 200 mg. The hydrochloride of the product melts at 175–178° C. with decomposition.

*Analysis.*—Calcd. for $C_{19}H_{27}O_3N \cdot HCl \cdot \frac{1}{2}H_2O$: C, 62.86%; H, 8.00%. Found: C, 63.07%; H, 8.55%.

We claim:

1. A compound of the class consisting of a free base and its hydrochloric acid and hydrobromic acid addition salts, the free base having the formula:

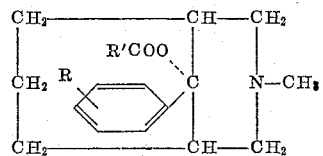

(I)

in which R is a member of the group consisting of hydrogen, alkyl of 1 to 2 carbon atoms and alkoxy of 1 to 2 carbon atoms and R' is alkyl of 1 to 2 carbon atoms.

2. The compound 3-methyl-9β-phenyl-9α-acetoxy-3-azabicyclo[3.3.1]nonane.

3. The compound 3-methyl-9β-phenyl-9α-propinonyloxy-3-azabicyclo[3.3.1]nonane.

4. The compound 3-methyl-9β-phenyl-9α-acetoxy-3-azabicyclo[3.3.1]nonane hydrochloride.

5. The compound 3-methyl-9β-phenyl-9α-propionyloxy-3-azabicyclo[3.3.1]nonane hydrochloride.

6. The compound 3-methyl-9β-phenyl-9α-hydroxy-3-azabicyclo[3.3.1]nonane.

7. A compound represented by the formula

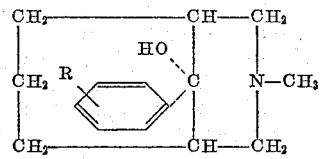

in which R is a member of the group consisting of hydrogen, alkyl of 1 to 2 carbon atoms and alkoxy of 1 to 2 carbon atoms.

8. A process for preparing a compound represented by the formula

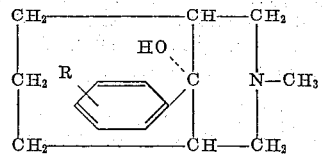

in which R is a member of the group consisting of hydrogen, alkyl of 1 to 2 carbon atoms and alkoxy of 1 to 2 carbon atoms, which comprises boiling a compound represented by the formula

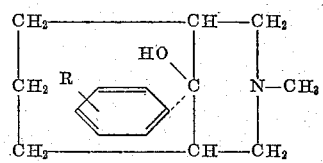

in which R has the same meaning as above in a diluted aqueous mineral acid selected from the group consisting of hydrochloric acid and hydrobromic acid.

References Cited by the Examiner

UNITED STATES PATENTS 2,921,938   1/60   Wetterau _____ 260—292

OTHER REFERENCES

Schneider et al.: "Naturwissenchaften," vol. 47, page 397 (1960).

IRVING MARCUS, *Primary Examiner.*

NICHOLAS S. RIZZO, WALTER A. MODANCE,
*Examiners.*